May 22, 1945.    F. D. JOHNSON    2,376,775
ELECTRICAL TESTING EQUIPMENT
Filed Oct. 28, 1942
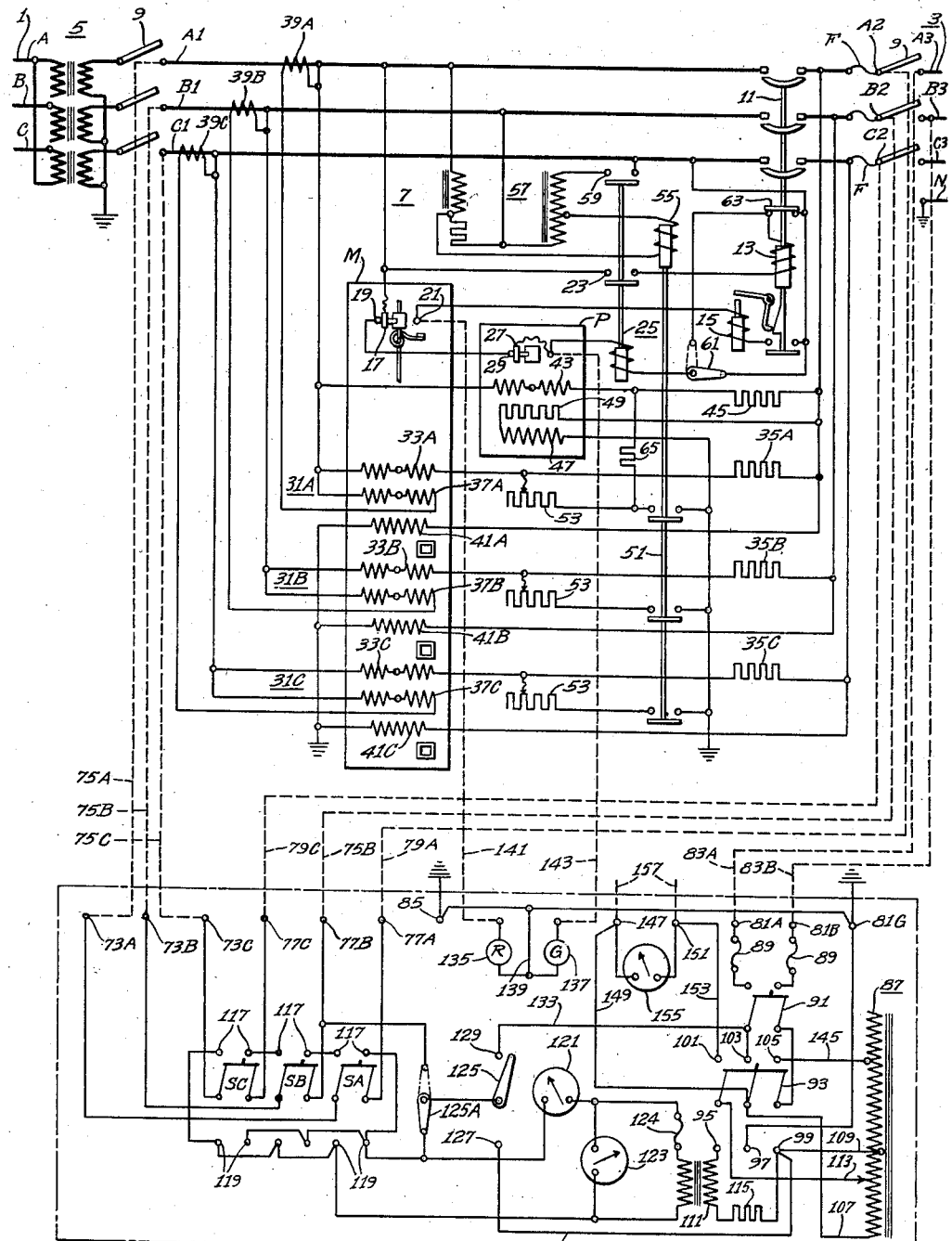
WITNESSES:
INVENTOR
Floyd D. Johnson.
BY
ATTORNEY Patented May 22, 1945

2,376,775

UNITED STATES PATENT OFFICE 2,376,775

ELECTRICAL TESTING EQUIPMENT

Floyd D. Johnson, Forest Hills, Pa., assignor to Westinghouse Electric & Manufacturing Company, East Pittsburgh, Pa., a corporation of Pennsylvania Application October 28, 1942, Serial No. 463,639

11 Claims. (Cl. 175—294)

This invention relates to electrical testing equipment and it has particular relation to equipment for testing and calibrating the relays and mechanism of a network protector.

In network distribution systems, a plurality of feeder circuits are employed for energizing a common network or grid circuit. Each of the feeder circuits is connected to the network circuits through a plurality of network transformers and network protectors. The network protector is designed to disconnect its associated network transformer from the network circuit when current flows in a reverse direction through the network protector, as to a fault occurring on the associated feeder circuit. The network protector also is designed to connect its associated network transformer to the network circuit when the associated feeder circuit is in condition to supply current to the network circuit.

A conventional form of network protector includes a circuit interrupter which is controlled by a master relay and some times in addition by a phasing relay. The master relay is directionally controlled to trip the circuit interrupter when the direction of current flow through the circuit interrupter reverses from its normal direction. If the master relay also is designed for phasing control, it operates to initiate a closure of the circuit interrupter when the associated feeder circuit is in condition to supply current to the network circuit. In some cases a phasing relay is employed to permit reclosure of the circuit interrupter only when the feeder circuit voltage leads the network circuit voltage. Other mechanisms such as auxiliary relays, trip coils and closing motors or solenoids are also provided in the network protector for controlling operation of the circuit interrupter.

In apparatus of this type it is desirable to test and calibrate the relays and mechanism at suitable intervals. Heretofore such testing has been effected by removing the master and phasing relays to a relay testing laboratory or table for test or calibration. This procedure is somewhat objectionable for the reason that considerable time is required therefor, and the relays are not tested under their normal conditions of operation. Furthermore, it has been the practice to provide sources of voltage and conductors for connecting the sources of voltage to the relays for test purposes. This procedure is tedious and requires careful and skilled operators for effecting the required connections between the sources of voltage and the relays to be tested.

In accordance with the invention, a complete portable testing equipment is provided for testing a circuit interrupter and its controlling mechanism on a network protector under its normal conditions of operation. For this purpose, the testing equipment may be provided with terminals to which the network protector to be tested may be connected. Switching devices are provided for connecting the poles of the network protector selectively in series, in parallel, and individually across a suitable source of voltage and current. In addition, a source of voltage is applied between the circuit established by the switching devices and other parts of the network protector for energizing windings of the network protector which are similarly connected. Preferably, the phase of this voltage may be varied with respect to the first source of voltage. In addition, a source of voltage is provided which may be connected across various mechanisms for testing the response thereto of the mechanisms. Measuring and indicating devices also are included for measuring the voltage and current supplied by the testing equipment and for indicating the operation of various parts of the network protector.

It is, therefore, an object of the invention to provide improved testing equipment for circuit interrupters and control mechanism therefor.

It is another object of the invention to provide a compact testing equipment for testing the relays and mechanism of a network protector.

It is a further object of the invention to provide in a testing equipment for network protectors, switching devices for connecting the poles of a network protector selectively in series, in parallel, and individually across a source of voltage and current.

It is still another object of the invention to provide testing equipment for a network protector which includes switching devices for connecting the poles of the network protector in series, in parallel, and individually across a source of voltage and current, and to provide means for applying between the circuit established by the switching devices and other parts of the network protector a second voltage having any of a plurality of phase relationships with respect to the voltage of the aforesaid source.

Other objects of the invention will be apparent from the following description taken in conjunction with the accompanying drawing in which the single figure is a schematic view of a system embodying the invention.

As previously explained, a network distribution system includes a plurality of feeder circuits for energizing a common network circuit. Each of the feeder circuits is connected to the network circuit through a plurality of network transformers and network protectors. In the drawing, a feeder circuit 1 is shown connected to a network circuit 3 through a network transformer 5 and a network protector 7. Although the number of phases, voltages and frequencies with which the system is designed to operate may vary appreciably, for the purpose of discussion it is assumed that the feeder circuit 1 is a three-phase circuit having three phase conductors A, B and C. As a specific example, the feeder circuit 1 may be designed for a phase-to-phase voltage of 4000 volts and a frequency of 60 cycles per second. The connections of the network transformer 5 also may vary but are illustrated as providing a delta-connected primary winding and a star-connected secondary winding having a grounded neutral. The secondary winding may be designed to provide a phase-to-phase voltage of 208 volts for energizing the network circuit.

The network protector 7 is illustrated as having three terminals A1, B1 and C1 for connection to the secondary winding of the network transformer 5, and three terminals A2, B2 and C2 for connection to the three phase conductors A3, B3 and C3 of the network circuit 3. If the network circuit is designed for four-wire operation, a neutral conductor N may be provided which is illustrated as being grounded. It will be understood that the fourth conductor may be represented by a separate conductor or by ground. Connection of the network protector 7 to the network transformer 5 and the network circuit 3 may be effected through connecting links 9 which are illustrated in their open or disconnected positions. If desired the connection to the network circuit 3 may be interrupted by disconnecting the fuses F.

The network protector 7 may be of any conventional construction. For the purpose of illustration, a network protector similar to that disclosed in Patent No. 1,997,697, is illustrated. Briefly, this network protector includes a three-pole circuit interrupter 11 for connecting and disconnecting the network transformer 5 and the network circuit 3. This circuit interrupter includes a closing motor or solenoid 13 and a trip coil 15. Energization of the trip coil 15 is effected by means of a master relay M having a movable contact 17 which is movable into engagement either with a closing contact 19 or a tripping contact 21. Engagement of the movable contact 17 with the tripping contact 21 connects the trip coil 15 across the phase conductors A and C when the circuit interrupter 11 is in closed condition.

When the circuit interrupter 11 is in open condition an energizing circuit for the closing solenoid 13 is completed through the front contacts 23 of a closing relay 25. Closure of the front contacts 23 connects the closing solenoid 13 across the phase conductors A and C of the network protector.

In certain network protector installations, pumping of the network protector may be substantially eliminated by the provision of a phasing relay P. This phasing relay has a movable contact 27 which is movable into and out of engagement with a fixed contact 29.

Energization of the closing relay 25 is effected by operation of the master relay M and the phasing relay P. When the movable contacts 17 of the master relay engages the fixed contact 19 thereof, and in addition the movable contact 27 of the phasing relay P engages the fixed contact 29 thereof, the energizing winding of the closing relay 25 is connected across the phase conductors A and C of the network protector. If sufficient voltage is present between these phase conductors, the closing relay picks up to initiate a closing operation of the circuit interrupter 11.

The master relay M includes a separate driving element 31A, 31B, or 31C for each phase conductor of the network protector. The element 31A includes a phasing winding 33A which is connected across the phase A pole of the circuit interrupter through a phasing resistor 35A. The element 31A also includes current windings 37A which are energized from a current transformer 39A in accordance with current flowing through the phase A conductor of the network protector. Finally, the element 31A includes a voltage winding 41A which is connected for energization in accordance with the voltage between the phase A conductor of the network protector and ground. In a similar manner the element 31B includes phasing windings 33B, current windings 37B energized from a current transformer 39B, a voltage winding 41B and a phasing resistor 35B which are associated with the phase B conductor of the network protector. The element 31C has phase windings 33C, current windings 37C energized from a current transformer 39C, a voltage winding 41C, and a phasing resistor 35C associated with the phase C conductor of the network protector.

When the circuit interrupter 11 is closed, the voltage and current windings of the master relay are energized in accordance with power supplied from the network transformer 5 to the network circuit 3. For normal conditions of power flow, the torque applied by the various elements to the movable contact 17 is such as to urge the contact towards its closing contact 19. When the direction of power flow reverses as to a fault occurring on the feeder circuit 1, the torque produced by the elements 31A, 31B and 31C actuates the movable contact 17 into engagement with the tripping contact 21 to trip the circuit interrupter 11.

When the circuit interrupter 11 is in open condition, the voltage windings of the master relay are energized in accordance with the voltages present on the network circuit and the phasing windings are energized in accordance with the voltages across the poles of the circuit interrupter 11. If the secondary voltages of the network transformer 5 are larger than the corresponding voltages of the network circuit 3 by a predetermined amount such as a fraction of a volt, the master relay M urges its movable contact 17 into engagement with the closing contact 19 to complete partially an energizing circuit for the closing relay 25.

As previously explained, phasing relays are sometimes desirable to prevent excessive pumping of the network protector. As illustrated in the drawing, the phasing relay P includes a phasing winding 43 which is connected across one pole of the circuit interrupter 11, such as the phase A pole, through a suitable phasing resistor 45. In addition, the phasing relay P includes a voltage winding 47 which is connected for energization in accordance with the voltage between the phase A conductor of the network circuit and ground through a resistor 49. As well understood in the art, the phasing relay P is designed to permit a closure of the circuit interrupter 11 only when the secondary voltages of the network transformer 5 lead the corresponding voltages of the network circuit 3.

To reduce unnecessary operation of the network protector it sometimes is desirable to render the network protector insensitive except when a substantial fault occurs on the feeder circuit. For this purpose an auxiliary relay 51 is provided having front contacts for connecting the phasing windings of the master relay M in star through suitable resistors 53. When the phasing windings are so connected they produce a restraining torque in the master relay which reduces the sensitivity thereof. The auxiliary relay 51 has an energizing winding 55 connected for energization in accordance with a positive phase sequence voltage derived from the phase conductors of the network protector. For this purpose, the energizing winding 55 is connected to the output terminals of a positive phase sequence voltage filter 57. By inspection of the drawing, it will be observed that connection of the positive phase sequence voltage filter 57 to the phase conductors of the network protector is completed through front contacts 59 of the closing relay 25. Consequently, the voltage filter 57 is fully energized only when the closing relay 25 is energized. The auxiliary relay 51 is designed to pick up and close its contacts when energized by a quantity corresponding to a positive phase sequence voltage above a predetermined value such as 95% of the normal positive phase sequence voltage. The auxiliary relay 51 is designed to drop out and open its contacts when the energizing quantity falls below a value corresponding to a positive phase sequence voltage of a predetermined value such as 85% of the normal value thereof. When a fault occurs on the feeder circuit 1, the positive phase sequence voltage drops sufficiently to permit the auxiliary relay 51 to open its contacts and condition the master relay M for sensitive operation.

If insensitive operation of the master relay M is not required, a switch 61 may be provided which can be transferred from the connection illustrated in full lines to the connection illustrated in dotted lines. In its dotted-line position, an energizing circuit for the closing relay 25 is established which is interrupted by a pallet switch 63 on the circuit interrupter 11 when the circuit interrupter closes. For this reason, when the circuit interrupter closes the closing relay 25 is de-energized and the auxiliary relay 55 remains with its contacts open.

A resistor 65 may be provided for forming with the phase resistor 45 a potentiometer circuit which energizes the phasing winding 43 of the phasing relay P when the contacts of the auxiliary relay 51 are closed. The energization of phasing winding 43 of the phasing relay P produces restraint in the phasing relay to prevent an undesired operation thereof while the auxiliary relay 51 is in its picked-up condition.

For testing the network protector, testing equipment is provided which may be enclosed in a suitable casing 71 shown in the drawing in broken lines. Because of its compact structure this equipment may be in portable form. The equipment includes three terminals 73A, 73B and 73C which are connected to the terminals A1, B1, C1 of the network protector respectively through conductors 75A, 75B and 75C shown in dotted lines. In addition the equipment includes three terminals 77A, 77B and 77C which are connected through suitable conductors 79A, 79B and 79C, respectively, to the terminals A2, B2 and C2. Consequently, the network protector is connected between the sets of terminals of the testing equipment.

For supplying power to the testing equipment, three terminals 81A, 81B and 81G are provided which are connected respectively to the phase conductors A3 and B3 of the network circuit through conductors 83A and 83B and to the neutral conductor N of the distribution circuit. The last connection is represented conventionally by a conventional ground symbol. A second ground terminal 85 may be provided to facilitate connection of the testing equipment to a grounding terminal of the network protector.

The terminals 81A, 81B and 81G are connected to the primary of a variable transformer 87 through suitable fuses 89, a double-pole single-throw switch 91, and a three-pole double-throw switch 93. Switch 93 has a first set of contacts 95, 97, 99 and a second group of contacts 101, 103 and 105. When the switch 91 is closed and the blades of the switch 93 engage the contacts 95, 97 and 99, the primary of the variable transformer 87 is connected across the terminals 81B and 81G through a conductor 107 and a fixed tap 109. Consequently, the primary of the variable transformer 87 which is represented as an autotransformer is connected for energization in accordance with the phase-B-to-ground voltage of the network circuit.

Engagement of the blades of the switch 93 with the contacts 95, 97 and 99 also connects the primary of an auxiliary transformer 111 between the fixed tap 109 and a variable tap 113 of the variable transformer 87. Consequently, voltage is applied to the primary of the transformer 111 which has a magnitude dependent upon the displacement of the variable tap 113 from the fixed tap 109, and which has either of two phase relationships differing in phase by 180°, depending on which side of the fixed tap 109 the movable tap 113 is located. An impedance such as a resistor 115 may be included in the circuit of the primary of the transformer 111 to control the phase of current flowing through the primary with respect to the voltage between the phase-conductor B3 and ground of the network circuit.

The secondary of the transformer 111 is connected to the poles of the circuit interrupter 11 through three double-pole double-throw switches SA, SB and SC. By inspection of the drawing, it will be observed that the blades of the switch SA are connected respectively to the terminals A1 and A2. In a similar manner the blades of the switch SB are connected to the terminals B1 and B2 and the blades of the terminal SC are connected to the terminals C1 and C2. Each of the switches has a first pair of contacts 117 and a second pair of contacts 119. When all of the switches SA, SB and SC are connected to their contacts 117, the three poles of the circuit interrupter are connected in series across the secondary of the transformer 111. When any of the switches engage its contacts 119, the associated pole of the circuit interrupter is connected across the secondary of the transformer 111. When all of the switches SA, SB and SC engage the contacts 119 all of the poles of the circuit interrupter 11 are connected in parallel across the secondary of the transformer 111.

If the circuit interrupter 11 is closed, the secondary of the transformer 111 directs a current through the poles which energizes the current windings of the master relay through the associated current transformers 39A, 39B and 39C. The value of this current may be indicated on a suitable indicating instrument such as an ammeter 121.

If the circuit interrupter 11 is open, the secondary of the transformer 111 applies a voltage thereacross which serves to energize the phasing windings of the master relay. The value of this voltage may be indicated on a suitable measuring instrument such as a voltmeter 123. Since the transformer 111 is designed to supply substantial current to the network protector, a protective fuse 124 may be included in the secondary circuit thereof.

In order to energize the voltage windings of the relays, the entire secondary circuit of the transformer 111 is raised to a predetermined voltage with respect to ground. A brief review of the characteristics of the master and phasing relays indicates that the voltage applied between the secondary circuit of the transformer 111 and ground must have a phase relation relative to the secondary voltage of the transformer 111 which depends upon the particular relay to be tested. For example, the master relay M has substantially a wattmeter characteristic. For this reason, the voltage applied to its phase and voltage windings may be substantially in phase. The phasing relay P has a reactive wattmeter characteristic to permit closure of the circuit interrupter 11 only when the phasing voltages across the terminals of the circuit interrupter lead the corresponding voltages of the network circuit.

To provide the required voltage, a single-pole double-throw switch 125 is provided having a switch connected to the secondary circuit of the transformer 111 and having fixed contacts 127 and 129 associated therewith. When the switch blade 125 is connected to the contact 127, the secondary circuit of the transformer 111 is connected through a conductor 131 to the fixed tap 109 of the variable transformer. Assuming that the switch 93 engages its contacts 95, 97 and 99, the voltage between the phase conductor B3 and ground is applied between the secondary circuit of the transformer 111 and ground. For this reason, under the assumed conditions, the voltage windings of the relays are energized in accordance with the voltage between the phase-conductor B3 of the network circuit and ground.

If the switch blade of the switch 125 engages the fixed contact 129, the secondary circuit of the transformer 111 is connected through a conductor 133 and one blade of the switch 91 to the phase A3 conductor of the network circuit. For this connection, voltage windings of the relays which are connected to the secondary circuit of the transformer 111 have applied thereacross a voltage corresponding to the voltage between the phase A3 conductor of the network circuit and ground. This voltage leads or lags the voltage applied to the transformer 111 by 120° or 60° depending on which side of the fixed tap 109 the movable tap 113 is connected to the variable transformer 87. Although a phase shifting network may be employed for applying between the contact 129 and ground a voltage displaced in phase by 90° from the voltage applied to the transformer 111, it has been found that the phase relay P may be adjusted satisfactorily when the phase voltage applied thereto leads the network circuit voltage applied thereto by 60° or 120°. For this reason, the simplified construction illustrated in the drawing is employed.

For indicating operation of the relays, suitable indicating devices such as a red lamp 135 and a green lamp 137 may be provided in the testing equipment. One terminal of each lamp is connected through a conductor 139 to ground. The remaining terminal of the red lamp is connected through a conductor 141 shown in dotted lines to the tripping contact 21 of the master relay M. Consequently, when the movable contact 17 of the master relay engages the tripping contact 21 thereof, the red lamp 135 is connected between the phase-A conductor of the network protector and ground.

The remaining terminal of the green lamp 137 is connected through a conductor 143 shown in dotted lines to the movable contact 27 of the phasing relay. Therefore, the voltage between the phase-A conductor of the network protector and ground is applied across the lamp 137 when the movable contacts 17 of the master relay engages the closing contact 19 thereof and the movable contact 27 of the phasing relay engages the fixed contact 29 thereof. It will be understood that when the closing characteristics of the phasing relay are to be tested, the master relay is blocked to maintain the movable contact 17 in engagement with the closing contact 19 thereof. In a similar manner, when the closing characteristics of the master relay are to be tested, the movable contact 27 of the phasing relay is blocked in engagement with the fixed contact 29. Under these circumstances, closure of the contacts of either relay is indicated by the green lamp.

Mechanism such as the closing solenoid and trip coil of the circuit interrupter and the relays 25 and 51 may be tested by applying thereto suitable voltages and currents. Since the voltages required for such tests may be somewhat higher than those required for the relays, the switch 93 is operated to engage the contacts 101, 103 and 105. This connects the terminal 107 of the variable transformer and a fixed tap 145 across the phases A3 and B3 of the network circuit. As examples of specific values which may be encountered in practice, if the network circuit has a phase-to-phase voltage of 208 volts such voltage is applied between the terminal 107 and the fixed tap 145. This may be contrasted with the phase-to-ground voltage of 120 volts which is applied between the terminal 107 and the tap 109 when the switch 93 engages its contacts 95, 97 and 99. When 208 volts are applied between terminal 107 and the tap 145, the variable transformer 87 may be proportioned to provide a range of adjustment of zero to 270 volts as the movable tap 113 is adjusted with respect to the terminal 107.

Engagement of the blades of the switch 93 with the contacts 101, 103 and 105 connects the terminal 107 of the variable transformer 87 to a terminal 147 provided in the testing equipment through a conductor 149. In addition, the movable tap 113 is connected to another terminal 151 through a conductor 153. Consequently, a voltage variable between zero and 270 volts is available between the terminals 147 and 151 for test purposes. The value of this voltage may be indicated on a suitable measuring instrument, such as a voltmeter 155. Suitable conductors 157 partly shown in dotted lines may be provided for connecting this voltage across mechanism to be tested.

It is believed that the operation of the testing equipment is apparent from the foregoing description. When the network protector 7 is to be tested, the links 9 are opened to disconnect the protector from its associated network transformer and from the network circuit 3. The conductors 75A, 75B and 75C then are connected to the terminals of the network protector as illustrated in the drawing. In addition, the terminals 81A, 81B and 81G are connected respectively to the phase conductors A3 and B3 and the neutral conductor N of the network circuit 3.

To test the tripping characteristics of the master relay M, the three switches SA, SB and SC are operated to engage their contacts 117. This connects the three poles of the network protector in series across the secondary of the transformer 111. The primary of the transformer 111 is energized by closing the switch 91 and by operating the switch 93 to engage its contacts 95, 97 and 99. As a result of such energization, a current flows in series through the three poles of the network protector which may be adjusted by manipulation of the adjustable tap 113 of the variable transformer 87, and the value of this current may be determined from the ammeter 121. The connection of the poles of the network protector in series reduces the current required for energization thereof. Since current flows through the three poles of the circuit interrupter, the current windings 37A, 37B and 37C of the master relay are energized from their current transformers 39A, 39B and 39C in the same manner as in normal operation of the network protector.

For energizing the voltage windings of the master relay, the switch 125 has its blade connected to the contact 127. This applies the voltage between the phase conductor B3 of the network circuit and ground across the voltage windings 41A, 41B and 41C of the master relay. When current is passed in tripping direction through the poles of the circuit interrupter in sufficient magnitude to cause a tripping operation of the master relay, the movable contact 17 thereof engages the tripping contact 21 to illuminate the red lamp 135. The magnitude of the current required for this tripping operation may be determined from the ammeter 121. If it is desired to measure the tripping current for both sensitive and insensitive operation of the master relay M, the auxiliary relay 51 may be blocked in the appropriate position to permit the required test to be carried out.

If the performance of only one element of the master relay is to be studied, such as the element 31A, the switch SA associated with the element to be tested is operated to engage its contacts 119. This results in the energization only of the phase A pole of the circuit interrupter 11 from the secondary of the transformer 111. Therefore, the testing equipment herein described may be employed for testing any of the elements as desired. It will be understood that during these tests the circuit interrupter is in closed condition.

Let it be assumed next that the closing characteristics of the master relay M are to be studied. To facilitate such a study, the movable contact 27 of the phasing relay may be blocked in engagement with the fixed contact 29. The circuit interrupter 11 is in open condition.

For energizing windings of the master relay, the switch SA, SB and SC all may be operated to engage the contacts 119. This places the poles of the circuit interrupter 11 in parallel across the secondary of the transformer 111. The voltage applied across the poles of the circuit interrupter may be ascertained from the voltmeter 123 and may be adjusted by manipulation of the adjustable tap 113 associated with the variable transformer 87. The blade of the switch 125 remains in engagement with the contact 127 and the switch 93 remains in engagement with the contacts 95, 97 and 99. Therefore, the voltage and phasing windings of the master relay M are energized by voltages derived from voltages between the phase conductor B3 of the network circuit and ground. When the phasing voltage is in proper direction and of sufficient magnitude to produce a closing operation of the circuit interrupter, the movable contact 17 of the master relay engages the closing contact 19 to illuminate the green lamp G.

If only one element of the master relay M is to have its closing characteristics studied, only the switch associated with that element is operated to engage the contacts 119. For example, if the closing characteristics of the element 31A are to be studied only the switch SA is operated to engage its contacts 119.

In order to test the operation of the phasing relay P, the movable contact 17 of the master relay M may be blocked in engagement with the closing contact 19. For this test the circuit interrupter 11 is in open condition and the switch SA engages its contacts 119 to place the phase A pole of the circuit interrupter across the secondary of the transformer 111. The switch 93 remains in engagement with its contacts 95, 97, and 99 to energize the phasing winding 43 of the phasing relay in the same manner by which the phasing windings of the master relay M were energized.

As previously pointed out, the phasing voltage applied to the phasing relay should lead the corresponding network circuit voltage in order to produce a closing operation thereof. For this reason, the switch 125 is actuated to engage its contact 129. Such operation of this switch applies the voltage between the phase conductor A3 and ground of the network circuit across the voltage winding 47 and resistance 49 of the phasing relay. Since the voltage applied to the phasing winding is derived from the voltage between the phase conductor B3 and ground of the network circuit, a sufficient displacement is available between the voltage energizing the windings of the phasing relay to effect an operation thereof. When the voltage applied to the phasing winding 43 is sufficient in magnitude to cause a closing operation of the relay contacts, the green lamp 137 is illuminated. The voltage required to produce an operation of the phasing relay may be ascertained from the voltmeter 123.

In order to test the mechanism of the network protector such as the trip coil, closing solenoid and the relay 25 and 51, the conductors 75A, 75B, 75C, 79A, 79B and 79C are not required. The two conductors 157 are connected across the winding of the particular mechanism to be tested. For example, if the closing solenoid of the circuit interrupter 11 is to be tested, the conductors 157 are connected to the terminals of the energizing winding on the closing solenoid 13. For this test, the switch 93 is operated to engage its contacts 101, 103 and 105. With the switch in this position, manipulation of the adjustable tap 113 provides between the terminals 147 and 151 a voltage which may be varied between zero and 270 volts as required. The voltage at which the closing solenoid operates to close the circuit interrupter 11 may be ascertained from the voltmeter 155. In a similar manner, the magnitude of the voltage which must be applied to the energizing winding of the trip coil 15, the relay 25 or the relay 51 to produce an operation thereof may be ascertained.

After completion of the various tests, the conductors associated with the testing equipment are removed and the links 9 are restored to connect the network protector to its associated network transformer and the network circuit.

It will be observed that a variable transformer 87 and a second transformer 111 are employed for energizing the current and phase windings of the relays to be tested. As further examples of specific values suitable for testing network protectors, the transformer 111 may be a step-down transformer having a ratio of 10 or 15 to 1. If the adjustable tap 113 is adjustable in one volt steps, an exceedingly fine voltage or current adjustment is available for controlling the energization of the current and phasing windings. It should be understood, however, that the specific values of the voltages, currents and ratios of the various parts of the testing equipment are selected in accordance with the values required for the apparatus to be tested.

With the connections thus far considered, current flowing to the voltage windings of the master relay passes through the current transformers 39A and 39B in the same direction. Consequently this current modifies slightly the tripping characteristic of the master relay.

If desired, the effect of such current on the tripping performance of the master relay may be rendered negligible by connecting the blade of the switch 125 to the terminal 77B. A double-throw, single-pole switch 125A is provided for transferring the connection of the blade of the switch 125 to the terminal 77B. When the switch 125A is in the position shown in dotted lines, current to the voltage windings does not flow through the current transformer 39C, and flows in opposite directions through the remaining two current transformer. For this reason the current has substantially no effect on the tripping performance of the master relay.

Although the invention has been described with reference to certain specific embodiments thereof, numerous modifications thereof are possible. Therefore, the invention is to be restricted only by the appended claims.

I claim as my invention:

1. In an assembly for connecting a multi-pole circuit interrupter having relay control means associated therewith to a source of electrical energy for test purposes, means for connecting the poles of said circuit interrupter in a series circuit for energization from the source of electrical energy, whereby the same electrical current flows successively through the poles of said circuit interrupter, said connecting means including switch means selectively operable for connecting any of said poles of said circuit interrupter individually to the source of electrical energy, and for connecting said poles of said circuit interrupter in said series circuit.

2. In an assembly for connecting a multi-pole circuit interrupter having relay control means associated therewith to a source of electrical energy for test purposes, a transformer having a primary winding designed for connection to said source of electrical energy, said transformer having a secondary winding insulated from said primary winding, means for connecting the poles of said circuit interrupter in a series circuit for energization from the secondary winding of said transformer, whereby the same electrical current flows successively through the poles of said circuit interrupter, said connecting means including switch means selectively operable for connecting any of said poles of said circuit interrupter individually to the secondary winding of said transformer, for connecting all of said poles in parallel to said secondary winding, and for connecting said poles of said circuit interrupter in said series circuit.

3. In an assembly for connecting a multi-pole circuit interrupter having relay control means associated therewith to a source of electrical energy for test purposes, said relay control means having first windings normally energized in accordance with current flowing through said circuit interrupter, and having second windings normally energized in accordance with voltages present between one side of the poles of said circuit interrupter and other parts of said circuit interrupter, means for connecting the poles of said circuit interrupter in a series circuit for energization from the source of electrical energy, whereby the same electrical current flows successively through the poles of said circuit interrupter to energize said first windings, said connecting means including switch means selectively operable for connecting any of said poles of said circuit interrupter individually to the source of electrical energy, and for connecting said poles of said circuit interrupter in said series circuit, and means for applying a voltage between said series circuit and said other parts of said circuit interrupter to energize said second windings.

4. In an assembly for connecting a multi-pole circuit interrupter having relay control means associated therewith to a source of electrical energy for test purposes, said relay control means having first windings normally energized in accordance with current flowing through said circuit interrupter, having second windings normally energized in accordance with voltages present between one side of the poles of said circuit interrupter and other parts of said circuit interrupter, and having third windings normally connected for energization in accordance with voltages present across the poles of said circuit interrupter, a transformer having a primary winding designed for connection to said source of electrical energy, said transformer having a secondary winding insulated from said primary winding, means for connecting the poles of said circuit interrupter in a series circuit for energization from the secondary winding of said transformer, whereby the same electrical current flows successively through the poles of said circuit interrupter to energize said first windings, said connecting means including switch means selectively operable for connecting any of said poles of said circuit interrupter individually to the secondary winding of said transformer, for connecting all of said poles in parallel to said secondary winding, and for connecting said poles of said circuit interrupter in said series circuit, and means for applying a voltage between said secondary winding and said other parts of said circuit interrupter to energize said second windings, said secondary winding operating to direct an electrical current through the poles of said circuit interrupter to energize said first windings when said circuit interrupter is closed, and said secondary winding operating to apply a voltage across the poles of said circuit interrupter to energize said third windings when said circuit interrupter is open.

5. In an assembly for testing a network protector designed to connect a feeder circuit to a network circuit, said protector including a multipole circuit interrupter and relay control means therefor, said relay control means including current transformer means energized in accordance with current flowing through the poles of said circuit interrupter, first relay windings energized in accordance with the output of said current transformer means, second relay windings energized in accordance with voltages present on one side of said circuit interrupter, and third relay windings energized in accordance with voltages across the poles of said circuit interrupter, an auxiliary transformer having a primary adapted for connection to said network circuit for energization therefrom, said auxiliary transformer having a secondary insulated from said primary, switch means for connecting said secondary to said poles of said circuit interrupter, said switch means including means selectively operable for connecting the poles of said circuit interrupter, individually, in series, and in parallel across said secondary, whereby current supplied by said secondary to said poles serves to energize said first relay windings through said current transformer means when said circuit interrupter is closed, and whereby said secondary applies a voltage to said third relay windings when said circuit interrupter is open, and means for applying a voltage between the secondary circuit of said auxiliary transformer and another part of said network protector for energizing said second relay windings, said last-named means including a switch selectively operable for varying the phase of said last-named voltage relative to the output voltage of said auxiliary transformer.

6. In an assembly for testing a polyphase network protector designed to connect a polyphase feeder circuit to a polyphase grounded-neutral network circuit, said protector including a multipole circuit interrupter and relay control means therefor, said relay control means including current transformer means energized in accordance with current flowing through the poles of said circuit interrupter, first relay windings energized in accordance with the output of said current transformer means, said relay windings energized in accordance with voltages between the poles of said circuit interrupter and ground, and third relay windings energized in accordance with voltages across the poles of said circuit interrupter, a test device comprising a plurality of terminals suitable for connection to the feeder circuit side of said circuit interrupter, a plurality of terminals suitable for connection to the network circuit side of said circuit interrupter, an auxiliary transformer having a primary adapted for connection to said network circuit for energization therefrom, said auxiliary transformer having a secondary insulated from said primary, switch means associated with said terminals for connecting said secondary to said poles of said circuit interrupter, said switch means including means selectively operable for connecting the poles of said circuit interrupter, individually, in series, and in parallel across said secondary, whereby current supplied by said secondary to said poles serves to energize said first relay windings through said current transformer means when said circuit interrupter is closed, and whereby said secondary applies a voltage to said third relay windings when said circuit interrupter is open, a plurality of terminals suitable for connection to said network circuit, means connecting the primary of said auxiliary transformer to said last-named terminals for energization from said network circuit, said last-named means including means for varying the voltage applied to said primary, means associated with said last-named terminals for applying between the secondary circuit of said auxiliary transformer and ground a voltage derived from said network circuit for energizing said second relay windings, said last-named means including switch means selectively operable for applying between said secondary circuit and ground a voltage having a phase relationship corresponding to that selected from either of two voltages of said network circuits having different phase relationships.

7. In an assembly for testing a polyphase electrical unit, a first set of polyphase terminals, a second set of polyphase terminals, whereby said electrical unit may be connected between said sets of terminals, a transformer having a primary and a secondary, switch means for connecting said terminals to said secondary, said switch means including means selectively operable for connecting the individual phases of an electrical unit connected between said sets of terminals individually and in series across the secondary of said transformer, means for energizing the primary of said transformer, said last-named means comprising an adjustable transformer effective for varying the energization of said primary, an auxiliary terminal, and means for applying a voltage between said secondary and said auxiliary terminal.

8. In an assembly for testing a polyphase electrical unit, a plurality of terminals including a first set of polyphase terminals, a second set of polyphase terminals, whereby said electrical unit may be connected between said sets of terminals, a transformer having a primary and a secondary switch, means for connecting said terminals to said secondary, said switch means including means selectively operable for connecting the individual phases of an electrical unit connected between said sets of terminals individually and in series across the secondary of said transformer, means for energizing the primary of said transformer, said last-named means comprising an adjustable transformer effective for varying the energization of said primary, and means for applying a voltage between a pair of said terminals, said means comprising switch means for connecting said last-named terminals to said adjustable transformer for energization therefrom, said switch means being effective for interrupting the connection of said first-named transformer to said adjustable transformer.

9. In an electrical assembly suitable for testing an electrical system, means for controlling the supply of electrical energy to said electrical system, said means comprising a transformer having a primary winding designed for energization from a source of alternating energy and a secondary winding insulated from said primary winding, a conductive member, means for applying a first voltage between said secondary winding and said conductive member, whereby a portion of said electrical system may be connected for energization across the terminals of the secondary winding of said transformer for energization in accordance with the secondary voltage of the transformer, and whereby a portion of said electrical system may be connected between said secondary winding and said conductive member for energization in accordance with said first voltage, and means for varying the phase relationship between said first voltage and said secondary voltage, whereby said electrical system may be tested for different phase relationships between said first voltage and said secondary voltage, and switch means suitable for connection to separate portions of said electrical system, said switch means being selectively operable for connecting said separate portions individually or together across said secondary winding.

10. In an electrical assembly suitable for testing a plurality of electrical elements of an electrical system, said assembly comprising a plurality of groups of terminals, each of said groups of terminals being suitable for having connected thereacross one of the electrical elements of an electrical system to be tested, a transformer having a primary winding and a secondary winding insulated from said primary winding, means for connecting said groups of terminals to said secondary winding, said connecting means including switch means selectively operable for connecting said groups of terminals individually, in parallel or in series across said secondary winding, whereby a plurality of electrical elements each connected to one of said groups of terminals may be connected either in series or individually, in parallel or in series across said secondary winding for energization therefrom, a conductive member, and means for applying a voltage between said secondary winding and said conductive member, whereby an electrical element of an electrical system to be tested may be connected for energization between said conductive member and any of the terminals connected to said secondary winding.

11. In an electrical assembly suitable for testing a plurality of electrical elements of an electrical system, said assembly comprising a plurality of groups of terminals, each of said groups of terminals being suitable for having connected thereacross one of the electrical elements of an electrical system to be tested, a transformer having a primary winding and a secondary winding insulated from said primary winding, means for connecting said groups of terminals to said secondary winding, said connecting means including switch means selectively operable for connecting said groups of terminals individually, in parallel or in series across said secondary winding, whereby a plurality of electrical elements each connected to one of said groups of terminals may be connected either in series or individually, in parallel or in series across said secondary winding for energization therefrom, a conductive member, means for applying a voltage between said secondary winding and said conductive member, whereby an electrical element of an electrical system to be tested may be connected for energization between said conductive member and any of the terminals connected to said secondary winding, and means for varying the phase relationship between said voltage and the voltage across said secondary winding, whereby the electrical elements of an electrical system may be tested when energized by voltages having various phase relationships.

FLOYD D. JOHNSON.